US012565583B2

(12) United States Patent
Kim et al.

(10) Patent No.: US 12,565,583 B2
(45) Date of Patent: Mar. 3, 2026

(54) THERMOPLASTIC RESIN COMPOSITION AND MOLDED PRODUCT MANUFACTURED THEREFROM

(71) Applicant: LOTTE CHEMICAL CORPORATION, Seoul (KR)

(72) Inventors: Doo Young Kim, Uiwang-si (KR); Heekyoung Ryoo, Uiwang-si (KR); Keehae Kwon, Uiwang-si (KR); Jaekeun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 1010 days.

(21) Appl. No.: 17/764,645

(22) PCT Filed: Sep. 29, 2020

(86) PCT No.: PCT/KR2020/013395

§ 371 (c)(1),
(2) Date: Mar. 29, 2022

(87) PCT Pub. No.: WO2021/066558

PCT Pub. Date: Apr. 8, 2021

(65) Prior Publication Data

US 2022/0340750 A1 Oct. 27, 2022

(30) Foreign Application Priority Data

Sep. 30, 2019 (KR) ........................ 10-2019-0121101
Sep. 28, 2020 (KR) ........................ 10-2020-0126322

(51) Int. Cl.
*C08L 69/00* (2006.01)
*C08K 3/22* (2006.01)
*C08K 5/521* (2006.01)

(52) U.S. Cl.
CPC ................ *C08L 69/00* (2013.01); *C08K 3/22* (2013.01); *C08K 5/521* (2013.01); *C08K 2003/2296* (2013.01); *C08L 2205/03* (2013.01)

(58) Field of Classification Search
CPC ........... C08L 69/00; C08L 51/04; C08L 35/04
See application file for complete search history.

(56) References Cited

U.S. PATENT DOCUMENTS 6,074,727 A 6/2000 Miller et al.
6,596,800 B1 7/2003 Zobel et al.
8,748,510 B2 * 6/2014 Inagaki .................. C08L 69/00 524/508
2016/0168377 A1 * 6/2016 Jang ........................ C08K 3/22 524/407
2018/0112056 A1 * 4/2018 Yang ........................ C08F 8/42
2018/0187003 A1 7/2018 Jung et al.
2018/0187006 A1 * 7/2018 Jang ........................ C08L 69/00
2020/0362160 A1 11/2020 Kim et al.

FOREIGN PATENT DOCUMENTS

EP 3351588 A1 7/2018
JP 06-297633 A 10/1994
JP 11-035787 A 2/1999
JP 4534980 B2 9/2010
JP 2011-094153 A 5/2011
JP 5213267 B2 6/2013
JP 5634980 B2 12/2014
KR 10-2001-0101140 A 11/2001
KR 10-0633624 B1 9/2005
KR 10-2007-0032419 A 3/2007
KR 10-0727231 B1 3/2007
KR 10-2010-0026702 A 3/2010
KR 10-0984536 A 5/2010
KR 10-2010-0078010 A 7/2010
KR 10-2011-0057415 A 6/2011
KR 10-1320326 B1 7/2011
KR 10-2015-0138275 A 12/2015
KR 10-1976246 B1 5/2018
KR 10-1968028 B1 4/2019
WO 2007/032573 A1 3/2007
WO 2019-132371 A1 7/2019
WO 2021/066558 A1 4/2021

OTHER PUBLICATIONS

Extended Search Report in counterpart European Application No. 20871184.6 dated Oct. 13, 2023, pp. 1-42.
Office Action in counterpart Korean Application No. 10-2020-126322 dated Nov. 13, 2023, pp. 1-5.
International Search Report in counterpart International Application Serial No. PCT/KR2020/013395 dated Jan. 8, 2021, pp. 1-6.

* cited by examiner

*Primary Examiner* — Brieann R Johnston
(74) *Attorney, Agent, or Firm* — Additon, Pendleton & Witherspoon P.A.

(57) ABSTRACT

Provided are a thermoplastic resin composition and a molded product manufactured therefrom, the thermoplastic resin composition including, based on 100 parts by weight of a base resin including (A) 75 to 85 wt % of a polycarbonate resin; (B) 7 to 15 wt % of an acrylic rubber-modified aromatic vinyl graft copolymer; and (C) 7 to 13 wt % of an aromatic vinyl-vinyl cyanide copolymer; (D) 0.7 to 5 parts by weight of zinc oxide (ZnO); and (E) 0.2 to 0.6 parts by weight of a phosphorus-based compound represented by Chemical Formula 1.

$$(RO)_nP(=O)(OH)_{3-n} \quad \text{[Chemical Formula 1]}$$

In Chemical Formula 1, n is an integer of 1 to 3, and

R is selected from a substituted or unsubstituted C1 to C30 alkyl group, a C2 to C30 alkenyl group, a C2 to C30 alkynyl group, a substituted or unsubstituted C1 to C30 and a substituted or unsubstituted C3 to C30 heteroaryl group.

14 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2020/013395, filed Sep. 29, 2020, which published as WO 2021/066558 on Apr. 8, 2021; Korean Patent Application No. 10-2019-0121101, filed in the Korean Intellectual Property Office on Sep. 30, 2019; and Korean Patent Application No. 10-2020-0126322, filed in the Korean Intellectual Property Office on Sep. 28, 2020, the entire disclosure of each of which is incorporated herein by reference.

TECHNICAL FIELD

A thermoplastic resin composition and a molded product manufactured therefrom are disclosed.

BACKGROUND ART

A polycarbonate (PC) resin is one of engineering plastics, and is a material that is widely used in the plastics industry.

The polycarbonate resin has a glass transition temperature (Tg) of about 150° C. due to a bulk molecular structure, such as bisphenol-A, which shows high heat resistance and may be an amorphous polymer having excellent transparency.

Furthermore, although having excellent impact resistance and compatibility with other resins, the polycarbonate resin has a drawback of low fluidity, so it is frequently used in a form of an alloy with various resins for complementing moldability and post-processability.

An acrylonitrile-styrene-acrylate (ASA) resin has excellent weather resistance and light resistance, and thus is widely used for outdoor building materials, vehicle interior/exterior materials, etc. However, since the ASA resin has insufficient impact resistance and the like, in order to be applied for the uses requiring high impact strength, a content of the acrylic rubber component of the ASA resin should be increased, but when the content of the acrylic rubber component is increased, heat resistance and the like are deteriorated, and accordingly, the ASA resin has a limit in being applied for the use requiring high heat resistance properties, for example, the automobile interior/exterior materials, etc.

Accordingly, a method of alloying the polycarbonate resin and the ASA resin to secure excellent heat resistance, impact resistance, weather resistance, and light resistance has been suggested, and this PC/ASA resin may be applied to various interior/exterior materials for automobiles.

However, this PC/ASA resin may be yellowed over time of use, and on the surface thereof, various bacteria may highly possibly grow. In order to further reinforce the weather resistance and the light resistance of the PC/ASA resin and improve antibacterial properties and the like, a method of adding an additive such as an antibacterial agent, a weathering stabilizer, and the like to the PC/ASA resin may be considered, but when an appropriate additive in an appropriate amount is not used, compatibility, impact resistance, and the like may be deteriorated, a large amount of gas and the like may be generated due to decomposition of the resin during the injection molding.

Accordingly, development of a thermoplastic resin composition having excellent antibacterial properties, weather resistance, light resistance, impact resistance, heat resistance, and the like is required.

DISCLOSURE

Description of the Drawings

Technical Problem

Provided is a thermoplastic resin composition having improved antibacterial properties, weather resistance, light resistance, impact resistance, heat resistance, and the like.

Another embodiment provides a molded product manufactured from the thermoplastic resin composition.

Technical Solution

According to an embodiment, a thermoplastic resin composition includes 100 parts by weight of a base resin including (A) 75 to 85 wt % of a polycarbonate resin, (B) 7 to 15 wt % of an acrylic rubber-modified aromatic vinyl graft copolymer, and (C) 7 to 13 wt % of an aromatic vinyl-vinyl cyanide copolymer; (D) 0.7 to 5 parts by weight of zinc oxide (ZnO); and (E) 0.2 to 0.6 parts by weight of a phosphorus-based compound represented by Chemical Formula 1.

$$(RO)_nP(=O)(OH)_{3-n} \quad \text{[Chemical Formula 1]}$$

In Chemical Formula 1, n is an integer of 1 to 3, and

R is selected from a substituted or unsubstituted C1 to C30 alkyl group, a C2 to C30 alkenyl group, a C2 to C30 alkynyl group, a substituted or unsubstituted C1 to C30 cycloalkyl group, a substituted or unsubstituted C6 to C30 aryl group, and a substituted or unsubstituted C3 to C30 heteroaryl group.

The (D) zinc oxide may have an average particle diameter (D50) of 0.5 to 3 μm.

The (D) zinc oxide may have a BET specific surface area of 1 to 10 $m^2/g$.

The (D) zinc oxide may have a peak position 2θ value obtained by X-ray diffraction (XRD) analysis of 35° to 37° and a crystallite size according to Equation 1 of 1,000 to 2,000 Å.

$$\text{Crystallite size}(D) = \frac{k\lambda}{\beta\cos\theta} \quad \text{[Equation 1]}$$

The (D) zinc oxide may have a size ratio (B/A) of a peak A in a 370 to 390 nm region to a peak B in a 450 to 600 nm region of 0.01 to 1 when measuring photoluminescence.

The (A) polycarbonate resin may have a melt flow index of 5 to 40 g/10 min, which is measured under the condition of 250° C. and a 10 kg load according to the ASTM D1238 standard.

In the (B) acrylic rubber-modified aromatic vinyl graft copolymer, the acrylic rubbery polymer may have an average particle diameter of 100 to 500 nm.

The (B) acrylic rubber-modified aromatic vinyl graft copolymer may be obtained by graft polymerization of a monomer mixture including an aromatic vinyl compound and a vinyl cyanide compound to 40 to 60 wt % of an acrylic rubbery polymer.

The (B) acrylic rubber-modified aromatic vinyl graft copolymer may be an acrylonitrile-styrene-acrylate graft copolymer.

The (C) aromatic vinyl-vinyl cyanide copolymer may be a copolymer of a monomer mixture including 60 to 85 wt % of an aromatic vinyl compound and 15 to 40 wt % of a vinyl cyanide compound.

The (C) aromatic vinyl-vinyl cyanide copolymer may have a melt flow index of 1 to 10 g/10 min measured under the condition of 200° C. and a 5 kg load according to ASTM D1238 standard.

The (C) aromatic vinyl-vinyl cyanide copolymer may be a styrene-acrylonitrile copolymer.

The thermoplastic resin composition may further include at least one additive selected from a flame retardant, a nucleating agent, a coupling agent, a filler, a plasticizer, an impact modifier, a lubricant, a release agent, a heat stabilizer, an antioxidant, an inorganic material additive, an ultraviolet (UV) stabilizer, an antistatic agent, a pigment, and a dye.

On the other hand, according to another embodiment, a molded product manufactured from the thermoplastic resin composition is provided.

The molded product may have a notched Izod impact strength of a ⅛"-thick specimen ranging from 30 to 100 kgf·cm/cm according to ASTM D256. The molded product may have each antibacterial activity value of 2 to 7 which is obtained by inoculating samples with *Staphylococcus aureus* and *Escherichia coli*, and measuring after 24 hours of incubation under the condition of 35° C. and RH of 90% according to the JIS Z 2801 antibacterial evaluation method. The molded product may have a color change (ΔE) of the specimen of greater than 0 and less than 0.4, which is measured at 89° C., RH of 50%, 84 $MJ/m^2$, and a lamp wavelength of 300 to 400 nm by a xenon arc test method specified in SAE J 1885.

The molded product may have a heat deflection temperature (HDT) of the specimen of 110 to 200° C., which is measured under a 18.56 kg load according to ASTM D648.

Advantageous Effects

The thermoplastic resin composition and molded product manufactured therefrom may have improved antibacterial properties, weather resistance, light resistance, impact resistance, heat resistance, and the like.

MODE FOR INVENTION

Hereinafter, embodiments of the present invention are described in detail. However, these embodiments are exemplary, the present invention is not limited thereto and the present invention is defined by the scope of claims.

In the present specification, "copolymerization" refers to block copolymerization to random copolymerization and "copolymer" refers to a block copolymer to a random copolymer.

In the present invention, unless otherwise mentioned, the average particle diameter of the rubbery polymer refers to a volume average diameter, and means a Z-average particle diameter measured using a dynamic light scattering analyzer.

In the present invention, unless otherwise mentioned, the average particle diameter of zinc oxide is a particle diameter (D50) corresponding to 50% of a weight percentage in a particle size distribution curve of single particles (particles do not aggregate to form secondary particles), which are measured by using a particle size analyzer (Laser Diffraction Particle Size Analyzer LS I3 320 equipment, Beckman Coulter, Inc.).

In the present invention, unless otherwise mentioned, the weight average molecular weight is measured by dissolving a powder sample in a solvent and performing gel permeation chromatography (GPC) with a 1200 series made by Agilent Technologies Inc. (a column: LF-804 made by Shodex, a standard sample: polystyrene made by Shodex).

In the present invention, unless otherwise mentioned, the specific surface area is measured using a nitrogen gas adsorption method with a BET analysis equipment (Surface Area and Porosity Analyzer ASAP 2020 equipment manufactured by Micromeritics).

A thermoplastic resin composition according to an embodiment includes 100 parts by weight of a base resin including (A) 75 to 85 wt % of a polycarbonate resin; (B) 7 to 15 wt % of an acrylic rubber-modified aromatic vinyl-based graft copolymer; and (C) 7 to 13 wt % of an aromatic vinyl-vinyl cyanide copolymer, (D) 0.7 to 5 parts by weight of zinc oxide (ZnO); and (E) 0.2 to 0.6 parts by weight of a phosphorus-based compound represented by Chemical Formula 1.

$$(RO)_nP(=O)(OH)_{3-n}$$ [Chemical Formula 1]

In Chemical Formula 1, n is an integer of 1 to 3, and

R is selected from a substituted or unsubstituted C1 to C30 alkyl group, a C2 to C30 alkenyl group, a C2 to C30 alkynyl group, a substituted or unsubstituted C1 to C30 cycloalkyl group, a substituted or unsubstituted C6 to C30 aryl group, and a substituted or unsubstituted C3 to C30 heteroaryl group.

Hereinafter, each component included in the thermoplastic resin composition will be described in detail.

(A) Polycarbonate Resin

The polycarbonate resin is a polyester having a repeating unit of a carbonate unit but has no particular limit in its type, and may include any polycarbonate resin usable in the resin composition field.

For example, it may be prepared by reacting a diphenol compound represented by Chemical Formula K with a compound selected from phosgene, halogen acid esters, carbonate esters, and a combination thereof.

[Chemical Formula K]

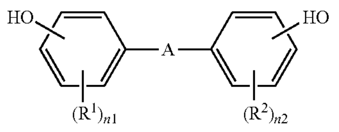

In Chemical Formula K,

A is a linking group selected from a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, $—Si(—R^{11})(—R^{12})$, —O—, —S—, and $—S(=O)_2—$, wherein $R^1$, $R^2$, $R^{11}$, and $R^{12}$ are each independently a substituted or unsubstituted C1 to C30 alkyl group or a substituted or unsubstituted C6 to C30 aryl group, and n1 and n2 are each independently an integer of 0 to 4.

Two or more types of the diphenol compounds represented by Chemical Formula K may be combined to constitute a repeating unit of the polycarbonate resin.

Specific examples of the diphenol compound may include hydroquinone, resorcinol, 4,4'-dihydroxydiphenyl, 2,2-bis (4-hydroxyphenyl)propane (also referred to as "bisphenol-A"), 2,4-bis(4-hydroxyphenyl)-2-methylbutane, bis(4-hydroxyphenyl)methane, 1,1-bis(4-hydroxyphenyl) cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Among the diphenol compounds, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, or 1,1-bis(4-hydroxyphenyl)cyclohexane may be desirably used. 2,2-bis (4-hydroxyphenyl)propane may be more desirably used.

The polycarbonate resin may be a mixture of copolymers obtained using two or more types of diphenol compound.

In addition, the polycarbonate resin may include a linear polycarbonate resin, a branched polycarbonate resin, a polycarbonate-polysiloxane copolymer resin, a polyester-polycarbonate copolymer resin, and the like.

Specific examples of the linear polycarbonate resin may be a bisphenol-A polycarbonate resin. Specific examples of the branched polycarbonate resin may be a resin prepared by reacting a multi-functional aromatic compound such as trimellitic anhydride, trimellitic acid, and the like with a diphenol compound and a carbonate. The polycarbonate-polysiloxane copolymer resin may include a resin prepared by reacting a siloxane compound having a hydroxyl group terminal end with a diphenol compound, and phosgene, halogen formate, diester carbonate, and the like.

The polyester-polycarbonate copolymer resin may be prepared by reacting bifunctional carboxylic acid with diphenols and a carbonate, wherein the used carbonate is a diaryl carbonate such as diphenyl carbonate or ethylene carbonate.

The polycarbonate resin may be prepared using an interfacial polymerization method (also called a solvent method (solvent polymerization) or a phosgene method), a melt polymerization method, or the like.

When the polycarbonate resin is prepared by a melt polymerization method, the transesterification reaction may be performed at a temperature of 150 to 300° C., for example 160 to 280° C., or specifically 190 to 260° C. under reduced pressure conditions of less than or equal to 100 torr, for example less than or equal to 75 torr, specifically, less than or equal to 30 torr, or more specifically less than or equal to 1 torr, for at least 10 minutes or more, for example, 15 minutes to 24 hours, or specifically 15 minutes to 12 hours. Within the above ranges, the reaction rate and side reactions may be desirably reduced, and gel formation may be reduced.

The reaction may be performed in the presence of a catalyst. As the catalyst, a catalyst used in a conventional transesterification reaction, for example, an alkali metal catalyst, an alkaline earth metal catalyst, etc. may be used. Examples of the alkali metal catalyst may include LiOH, NaOH, KOH, and the like but is not limited thereto. These may be used alone or in mixture of 2 or more types. The content of the catalyst may be used in the range of $1\times10^{-8}$ to $1\times10^{-3}$ mol, for example, $1\times10^{-7}$ to $1\times10^{-4}$ mol per 1 mol of the diphenol compound. Sufficient reactivity may be obtained within the above range, and the generation of by-products due to side reactions may be minimized, thereby improving thermal stability and color tone stability.

When the polycarbonate resin is prepared by an interfacial polymerization method, although detailed reaction conditions may be variously adjusted, for example, the following method may be adopted: a reactant of an diphenol compound is dissolved or dispersed in caustic soda of water or potash, and the mixture is added to a water-immiscible solvent, so that the reactant may contact a carbonate, for example, under a pH condition adjusted into about 8 to about 10 and under presence of triethylamine, a phase transfer catalyst, or the like.

Examples of the water-immiscible solvent may include methylene chloride, 1,2-dichloroethane, chlorobenzene, toluene, and the like.

Examples of the carbonate precursor may include a carbonyl halide such as carbonyl bromide or carbonyl chloride, a haloformate such as bishaloformate of dihydric phenols (e.g., bischloroformate such as bisphenol A and hydroquinone) or a haloformate such as a bishaloformate of glycol (e.g., a bishaloformate such as ethylene glycol, neopentyl glycol, or polyethylene glycol).

Examples of the phase transfer catalyst may include $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3NX$, wherein X is selected from a halogen, a C1 to C8 alkoxy group, and a C6 to C188 aryloxy group), and the like.

The polycarbonate resin may have a weight average molecular weight of 10,000 to 200,000 g/mol, for example, 10,000 to 90,000 g/mol, for example 14,000 to 90,000 g/mol, for example 14,000 to 80,000 g/mol, for example 14,000 to 70,000 g/mol, for example 14,000 to 60,000 g/mol, for example 14,000 to 50,000 g/mol, or for example 14,000 to 40,000 g/mol. When the weight average molecular weight of the polycarbonate resin is within the above ranges, a molded product manufactured therefrom may obtain excellent impact resistance and fluidity.

The polycarbonate resin may have for example a melt flow index of 5 to 40 g/10 min, for example 8 to 40 g/10 min, for example 8 to 35 g/10 min, for example 10 to 35 g/10 min, or for example 10 to 33 g/10 min, which is measured under the condition of 250° C. and a 10 kg load according to ASTM D1238. When the polycarbonate resin having a melt flow index within the above range is used, a molded product manufactured therefrom may exhibit excellent impact resistance and fluidity.

The polycarbonate resin may be used by mixing two or more types of polycarbonate resins having different weight average molecular weights or melt flow indexes. By mixing and using polycarbonate resins of different weight average molecular weights or melt flow indexes, the thermoplastic resin composition may be controlled to have desired fluidity and/or a weight average molecular weight.

The polycarbonate resin may be included in an amount of 75 to 85 wt %, for example 78 to 85 wt %, or for example 78 to 82 wt % based on 100 wt % of the base resin. When the amount of the polycarbonate resin is less than 75 wt %, mechanical strength and heat resistance of the thermoplastic resin composition and the molded product manufactured therefrom may be deteriorated, and when it exceeds 85 wt %, moldability of the thermoplastic resin composition and the molded product manufactured therefrom may be deteriorated.

(B) Acrylic Rubber-Modified Aromatic Vinyl Graft Copolymer

The acrylic rubber-modified aromatic vinyl graft copolymer has a function of enhancing light resistance, weather resistance, and impact resistance of the thermoplastic resin composition.

In an embodiment, the acrylic rubber-modified aromatic vinyl graft copolymer may be prepared by graft polymerization of a monomer mixture including an aromatic vinyl compound and a vinyl cyanide compound to an acrylic rubbery polymer.

The acrylic rubber-modified aromatic vinyl graft copolymer may be prepared according to any preparation method known to those skilled in the art.

The preparation method may include conventional polymerization methods, for example, emulsion polymerization, suspension polymerization, solution polymerization, and bulk polymerization. As a non-limiting example, it may be prepared by a method including preparing an acrylic rubbery polymer, and then graft-polymerizing a monomer mixture including an aromatic vinyl compound and a vinyl cyanide compound may be on a core formed of one or more layers of the acrylic rubbery polymer to form one or more shell layers.

The acrylic rubbery polymer may be prepared using an acrylic monomer as a main monomer. The acrylic monomer may be one or more selected from ethyl acrylate, butyl acrylate, 2-ethylhexyl acrylate, and hexyl acrylate, but is not limited thereto.

The acrylic monomer may be copolymerized with one or more radically polymerizable other monomers. When copolymerized, an amount of the one or more radically polymerizable other monomers may be 1 to 30 wt %, or specifically 1 to 20 wt %, based on the total weight of the acrylic rubbery polymer.

The aromatic vinyl compound included in the shell layer may be at least one selected from styrene, α-methylstyrene, p-methylstyrene, pt-butylstyrene, 2,4-dimethylstyrene, chlorostyrene, vinyltoluene, and vinylnaphthalene, but is not limited thereto.

The vinyl cyanide compound included in the shell layer may be at least one selected from acrylonitrile, methacrylonitrile, and fumaronitrile, but is not limited thereto.

Based on total 100 wt % of the acrylic rubber-modified aromatic vinyl graft copolymer, the acrylic rubbery polymer may be included in an amount of 40 to 60 wt %, or for example 45 to 55 wt %.

In the shell layer formed by graft-polymerization of the monomer mixture including the aromatic vinyl compound and the vinyl cyanide compound to the acrylic rubbery polymer, the aromatic vinyl compound may be included in an amount of 50 to 80 wt %, or specifically 60 to 75 wt % based on the total weight of the shell layer and the vinyl cyanide compound may be included in an amount of 20 to 50 wt %, or specifically 25 to 40 wt %, based on the total weight of the shell layer.

In an embodiment, the acrylic rubber-modified aromatic vinyl graft copolymer may include an acrylonitrile-styrene-acrylate graft copolymer (g-ASA). For example, the acrylic rubber-modified aromatic vinyl graft copolymer may be an acrylonitrile-styrene-acrylate graft copolymer.

As a non-limiting example, the acrylonitrile-styrene-acrylate graft copolymer may be a core-shell type acrylonitrile-styrene-acrylate graft copolymer prepared by graft polymerization of a mixture of acrylonitrile and styrene, to two or more layers of a butyl acrylate rubbery polymer core including an inner core made of copolymerized butyl acrylate and an outer core made of styrene and butyl acrylate polymer.

In an embodiment, the acrylic rubber-modified aromatic vinyl graft copolymer may include the acrylic rubbery polymer having an average particle diameter of greater than or equal to 100 nm, for example greater than or equal to 150 nm, or for example greater than or equal to 200 nm, and for example less than or equal to 500 nm, for example less than or equal to 450 nm, or for example less than or equal to 400 nm, or for example 100 to 500 nm, for example 150 to 450 nm, or for example 200 to 400 nm.

When the average particle diameter of the acrylic rubbery polymer in the acrylic rubber-modified aromatic vinyl graft copolymer is less than 100 nm, mechanical properties such as impact resistance and tensile strength of the thermoplastic resin composition including the same may be deteriorated.

On the other hand, when the average particle diameter of the acrylic rubbery polymer in the acrylic rubber-modified aromatic vinyl graft copolymer exceeds 500 nm, fluidity and processability of the thermoplastic resin composition including the same may be reduced.

The acrylic rubber-modified aromatic vinyl graft copolymer may be included in an amount of greater than or equal to 7 wt %, or for example greater than or equal to 8 wt %, and for example less than or equal to 15 wt %, or for example less than or equal to 13 wt %, or for example 7 to 15 wt %, or for example 8 to 13 wt %.

When the content of the acrylic rubber-modified aromatic vinyl graft copolymer in the base resin is less than 7 wt %, impact resistance of the thermoplastic resin composition and molded product manufactured therefrom may be deteriorated, and when the content exceeds 13 wt %, the mechanical strength and coloring properties of the thermoplastic resin composition and molded product manufactured therefrom may be deteriorated.

(C) Aromatic Vinyl-Vinyl Cyanide Copolymer

The aromatic vinyl-vinyl cyanide copolymer functions to improve fluidity and maintain compatibility between components of the thermoplastic resin composition at a certain level.

In an embodiment, the aromatic vinyl-vinyl cyanide copolymer may be a copolymer of a monomer mixture including an aromatic vinyl compound and a vinyl cyanide compound. The aromatic vinyl-vinyl cyanide copolymer may have a weight average molecular weight of greater than or equal to 80,000 g/mol, for example greater than or equal to 85,000 g/mol, or for example greater than or equal to 90,000 g/mol, and for example less than or equal to 200,000 g/mol, or for example less than or equal to 150,000 g/mol, or for example 80,000 to 200,000 g/mol, or for example 80,000 to 150,000 g/mol.

The aromatic vinyl compound may be at least one selected from styrene, α-methylstyrene, p-methylstyrene, p-t-butylstyrene, 2,4-dimethylstyrene, chlorostyrene, vinyltoluene, and vinylnaphthalene.

The vinyl cyanide compound may be at least one selected from acrylonitrile, methacrylonitrile, and fumaronitrile.

In an embodiment, the aromatic vinyl-vinyl cyanide copolymer may be a styrene-acrylonitrile copolymer (SAN).

In an embodiment, based on 100 wt % of the aromatic vinyl-vinyl cyanide copolymer, a component derived from the aromatic vinyl compound may be included in an amount of greater than or equal to 60 wt %, for example greater than or equal to 65 wt %, or for example greater than or equal to 70 wt %, and for example, less than or equal to 85 wt %, or for example, less than or equal to 80 wt %, or for example, 60 to 85 wt %, or for example, 60 to 80 wt %.

In an embodiment, based on 100 wt % of the aromatic vinyl-vinyl cyanide copolymer, a component derived from the vinyl cyanide compound may be included in an amount of greater than or equal to 15 wt %, or for example greater than or equal to 20 wt %, and for example less than or equal to 40 wt %, for example less than or equal to 35 wt %, or for example less than or equal to 30 wt %, or for example 15 to 40 wt %, or for example 20 to 40 wt %.

In an embodiment, the aromatic vinyl-vinyl cyanide copolymer may have a melt flow index of greater than or equal to 1 g/10 min, greater than or equal to 1.5 g/10 min, or greater than or equal to 2 g/10 min, and less than or equal to 10 g/10 min, less than or equal to 9 g/10 min, less than or equal to 8 g/10 min, less than or equal to 7 g/10 min, less than or equal to 6 g/10 min, or less than or equal to 5 g/10 min, or for example 1 to 10 g/10 min, for example 1 to 9 g/10 min, for example 1 to 8 g/10 min, for example 1 to 7 g/10 min, for example 1 to 6 g/10 min, for example 1 to 5 g/10 min, or for example 1.5 to 5 g/10 min, which is measured under the condition of 200° C. and a 5 kg load according to ASTM D1238 standard.

In an embodiment, the aromatic vinyl-vinyl cyanide copolymer may be included in an amount of greater than or equal to 7 wt %, or for example greater than or equal to 8 wt %, and for example less than or equal to 13 wt %, or for example less than or equal to 12 wt %, or for example 7 wt % to 13 wt %, or for example 8 wt % to 12 wt %, based on 100 wt % of the base resin.

When the content of the aromatic vinyl-vinyl cyanide copolymer is less than 7 wt %, mechanical strength and fluidity of the thermoplastic resin composition and molded product manufactured therefrom may be deteriorated and when it exceeds 13 wt %, impact resistance of the thermoplastic resin composition and molded product manufactured therefrom may be deteriorated.

(D) Zinc Oxide

The zinc oxide functions to improve antibacterial properties, light resistance, and weather resistance of a thermoplastic resin composition and a molded product manufactured therefrom.

In an embodiment, the zinc oxide may have an average particle diameter (D50) of greater than or equal to 0.5 μm, for example greater than or equal to 0.8 μm, or for example greater than or equal to 1 μm, and for example less than or equal to 5 μm, for example less than or equal to 4 μm, or for example less than or equal to 3 μm, or for example 0.5 to 5 μm, for example 0.5 to 4 μm, for example 0.5 to 3 μm, or for example 0.8 to 3 μm.

In an embodiment, the zinc oxide may have a BET specific surface area of greater than or equal to 1 $m^2$/g, and for example less than or equal to 10 $m^2$/g, for example less than or equal to 9 $m^2$/g, for example less than or equal to 8 $m^2$/g, or for example less than or equal to 7 $m^2$/g, or for example 1 to 10 $m^2$/g, or for example 1 to 7 $m^2$/g.

When the average particle diameter and/or BET specific surface area of the zinc oxide is out of the above range, light resistance, weather resistance, antibacterial properties, and the like of the thermoplastic resin composition including the zinc oxide and a molded product manufactured therefrom may be deteriorated.

In an embodiment, the purity of the zinc oxide as measured from a residual weight at a temperature of 800° C. using TGA thermal analysis may be greater than or equal to 99%.

In an embodiment, the zinc oxide may have a peak position 2θ value obtained by X-ray diffraction (XRD) analysis of 35° to 37°, and a crystallite size of 1,000 to 2,000 Å, for example 1,200 to 1,800 Å, which is calculated based on the measured FWHM value (full width at half maximum of the diffraction peak) by applying to Scherrer's equation (Equation 1).

Specifically, the crystallite size may be measured by using a high resolution X-ray diffractometer (PRO-MRD, X'pert) regardless of a specimen type (e.g., powder form, injection specimen). On the other hand, when an injection specimen is used, XRD may be more accurately analyzed by heat-treating the specimen at 600° C. in the air for 2 hours to remove a residual polymer resin.

When the peak position, and/or crystallite size of the zinc oxide are out of the above ranges, light resistance, weather resistance, antibacterial properties, and the like of the thermoplastic resin composition including the same and molded product manufactured therefrom may be deteriorated.

$$\text{Crystallite size}(D) = \frac{k\lambda}{\beta\cos\theta} \quad \text{[Equation 1]}$$

In Equation 1, k is a shape factor, λ is an X-ray wavelength, β is a FWHM value (degree) of an X-ray diffraction peak, and θ is a peak position value (degree).

In an embodiment, the zinc oxide may have various shapes, for example, a spherical shape, a plate shape, a rod shape, and a combination thereof.

In an embodiment, the zinc oxide may have a size ratio (PL size ratio, B/A) of a peak A in a 370 to 390 nm region to a peak B in a 450 to 600 nm region when measuring photoluminescence of 0.01 to 1, for example 0.1 to 1, or specifically 0.1 to 0.5.

The photoluminescence may be measured by putting zinc oxide powder in a pelletizer with a diameter of 6 mm and compressing it to prepare a specimen in a flat state and then, irradiating the specimen by an He—Cd laser at a wavelength of 325 nm (30 mW, KIMMON KOHA) at room temperature and detecting a spectrum of light emitted therefrom with a CCD detector, wherein the CCD detector may be maintained at −70° C.

When the zinc oxide has a PL size ratio within the range, a thermoplastic resin composition including the same and a molded product manufactured therefrom may exhibit excellent light resistance, weather resistance, and antibacterial properties.

In an embodiment, the zinc oxide may be prepared by melting metallic zinc and then, heating it at 850 to 1,000° C., for example, 900 to 950° C. to evaporate it, injecting oxygen gas thereinto, cooling it to 20 to 30° C., and then, heating it at 400 to 900° C., for example 500 to 800° C. for 30 to 150 minutes, for example, 60 to 120 minutes.

In an embodiment, the zinc oxide may be included in an amount of 0.7 to 5 parts by weight, for example 0.8 to 5 parts by weight, for example 0.8 to 4.5 parts by weight, for example 1 to 4.5 parts by weight, or for example 1 to 4 parts by weight, based on 100 parts by weight of the base resin.

When the zinc oxide is included in an amount of less than 0.7 parts by weight, light resistance, weather resistance, antibacterial properties, impact resistance, and the like of a thermoplastic resin composition and a molded product manufactured therefrom may be deteriorated, but when the zinc oxide is included in an amount of greater than 5 parts by weight, weather resistance, light resistance, heat resistance, thermal stability, and the like of a thermoplastic resin composition and a molded product manufactured therefrom may be deteriorated.

(E) Phosphorus-based Compound Represented by Chemical Formula 1

The thermoplastic resin composition according to an embodiment includes a predetermined phosphorus-based compound. The predetermined phosphorus-based compound may be represented by Chemical Formula 1.

$$(RO)_nP(=O)(OH)_{3-n} \quad \text{[Chemical Formula 1]}$$

In Chemical Formula 1, n is an integer of 1 to 3, and

R is selected from a substituted or unsubstituted C1 to C30 alkyl group, a C2 to C30 alkenyl group, a C2 to C30 alkynyl group, a substituted or unsubstituted C1 to C30 cycloalkyl group, a substituted or unsubstituted C6 to C30 aryl group, and a substituted or unsubstituted C3 to C30 heteroaryl group.

In an embodiment, the phosphorus-based compound represented by Chemical Formula 1 may be, for example, trimethyl phosphate, triethyl phosphate, triphenyl phosphate, stearyl phosphate, and the like, which may be used alone or a mixture of two or more.

The phosphorus-based compound represented by Chemical Formula 1 may prevent deterioration of the thermoplastic resin composition (e.g., decomposition of a polycarbonate resin and the like) caused by the addition of the zinc oxide. In other words, the thermoplastic resin composition according to an embodiment, since the phosphorus-based compound represented by Chemical Formula 1 is used with the zinc oxide, exhibits excellent light resistance, weather resistance, and antibacterial properties and also, maintain excellent balance among the other properties heat resistance, impact resistance, thermal stability, and the like.

The phosphorus-based compound represented by Chemical Formula 1 may be included in an amount of greater than or equal to 0.2 parts by weight, for example, greater than or equal to 0.25 parts by weight, or for example greater than or equal to 0.3 parts by weight, and for example, less than or equal to 0.6 parts by weight, for example, less than or equal to 0.55 parts by weight, for example, less than or equal to 0.5 parts by weight, or for example 0.2 to 0.6 parts by weight, for example 0.25 to 0.55 parts by weight, or for example 0.3 to 0.5 parts by weight based on 100 parts by weight of a base resin.

When the phosphorus-based compound represented by Chemical Formula 1 is out of the above ranges, the property balance of a thermoplastic resin composition including the same and a molded product manufactured therefrom may be deteriorated, and particularly, impact resistance, weather resistance, light resistance, and the like may be greatly deteriorated.

(F) Additives

In addition to the components (A) to (E), the thermoplastic resin composition according to an embodiment may further include one or more additives required in order to balance physical properties under the condition of minimizing deterioration of the properties of the thermoplastic resin composition during processing or use or one or more additives necessary according to a final use of the thermoplastic resin composition.

Specifically, the additives may include at least one additive selected from a flame retardant, a nucleating agent, a coupling agent, a filler, a plasticizer, an impact modifier, a lubricant, a release agent, a heat stabilizer, an antioxidant, an inorganic material additive, an ultraviolet (UV) stabilizer, an antistatic agent, a pigment, a dye, and the like and may be used alone or in a combination of two or more.

These additives may be appropriately included within a range that does not impair the physical properties of the thermoplastic resin composition, and specifically, may be included in an amount of less than or equal to 20 parts by weight based on 100 parts by weight of the base resin, but are not limited thereto.

On the other hand, the thermoplastic resin composition according to an embodiment may be mixed with other resin or other rubber component and used together.

Another embodiment provides a molded product manufactured using a thermoplastic resin composition according to an embodiment. The molded product may be produced by various methods known in the art, such as injection molding and extrusion molding using the thermoplastic resin composition.

The molded product may have a notched Izod impact strength of greater than or equal to 30 kgf·cm/cm, for example greater than or equal to 31 kgf·cm/cm, for example greater than or equal to 32 kgf·cm/cm, for example greater than or equal to 33 kgf·cm/cm, for example greater than or equal to 34 kgf·cm/cm, for example greater than or equal to 35 kgf·cm/cm, for example greater than or equal to 36 kgf·cm/cm, for example greater than or equal to 37 kgf·cm/cm, for example greater than or equal to 38 kgf·cm/cm, for example greater than or equal to 39 kgf·cm/cm, or for example greater than or equal to 40 kgf·cm/cm, and for example less than or equal to 100 kgf·cm/cm, for example less than or equal to 90 kgf·cm/cm, for example less than or equal to 80 kgf·cm/cm, or for example less than or equal to 70 kgf·cm/cm, for example 30 to 100 kgf·cm/cm, for example 35 to 100 kgf·cm/cm, or for example 40 to 100 kgf·cm/cm, for a ⅛"-thick specimen according to ASTM D256.

The molded product may have each antibacterial activity value of greater than or equal to 2, for example greater than or equal to 2.5, for example greater than or equal to 3, for example greater than or equal to 3.5, or for example greater than or equal to 4, for example less than or equal to 7, or for example less than or equal to 6.5, for example 2 to 7, for example 3 to 7, or for example 4 to 7, which is obtained by inoculating specimens with *Staphylococcus aureus* and *Escherichia coli*, and measuring after 24 hours of incubation under the condition of 35° C. and RH of 90% according to the JIS Z 2801 antibacterial evaluation method.

The molded product may have a color change (ΔE) of greater than 0 and less than 0.4, for example, greater than 0 and less than or equal to 0.35, or for example, greater than 0 and less than or equal to 0.3, which is measured at 89° C. under RH of 50% at 84 $MJ/m^2$ at a lamp wavelength of 300 to 400 nm in a xenon arc test method specified in SAE J 1885.

The molded product may have a heat deflection temperature (HDT) of 110 to 200° C., for example, 115 to 200° C., which is measured under a 18.56 kg load according to ASTM D648.

As such, the molded product has improved impact resistance, antibacterial properties, antistatic properties, and light resistance and thus may be advantageously used for various electrical and electronic parts, building materials, sporting goods, and automobile interior/exterior parts. Specifically, the molded product may be used for automotive interior materials, for example, automotive overhead consoles and the like that require high heat resistance, light resistance, and impact resistance and additionally, antibacterial properties but is not limited thereto.

Hereinafter, the present invention is illustrated in more detail with reference to examples. These examples, however, are not in any sense to be interpreted as limiting the scope of the invention.

Examples 1 to 4 and Comparative Examples 1 to 6

The thermoplastic resin compositions of Examples 1 to 4 and Comparative Examples 1 to 6 were prepared according to the component content ratios described in Table 1.

In Table 1, (A), (B), and (C), which are included in the base resin, are expressed in weight percent (wt %) based on the total weight of the base resin, and (D) and (E) which are added to the base resin, are expressed in parts by weight based on 100 parts by weight of the base resin.

The components shown in Table 1 were dry-mixed, and quantitatively and continuously added into the feeding section (barrel temperature: about 260° C.) of a twin-screw extruder (L/D=44, ϕ=35 mm), and melted/kneaded. Subsequently, after drying the thermoplastic resin compositions that were pelletized through a twin-screw extruder at about 80° C. for about 4 hours, specimens for physical property evaluation were produced, respectively, using a 6 oz injection molding machine set to a cylinder temperature of about 280° C. and a mold temperature of about 80° C.

TABLE 1

| Components | | unit | Examples 1 | 2 | 3 | 4 | Comparative Examples 1 | 2 | 3 | 4 | 5 | 6 |
|---|---|---|---|---|---|---|---|---|---|---|---|---|
| Base resin | (A) | wt % | 80 | 80 | 80 | 80 | 80 | 80 | 80 | 80 | 80 | 80 |
| | (B) | wt % | 10 | 10 | 10 | 10 | 10 | 10 | 10 | 10 | 10 | 10 |
| | (C) | wt % | 10 | 10 | 10 | 10 | 10 | 10 | 10 | 10 | 10 | 10 |
| (D) | | parts by weight | 1 | 2 | 2 | 4 | 0 | 0.5 | 1 | 2 | 6 | 6 |
| (E) | | parts by weight | 0.2 | 0.2 | 0.4 | 0.4 | 0 | 0 | 0 | 0.1 | 0.2 | 0.4 |

(A) Polycarbonate Resin

Polycarbonate resin (Lotte Advanced Materials Co., Ltd.) having a weight average molecular weight of 20,000 to 30,000 g/mol and a melt flow index of about 11 to 15 g/10 min measured under the condition of 250° C. and a 10 kg load according to ASTM D1238

(B) Acrylic Rubber-Modified Aromatic Vinyl Graft Copolymer

Acrylonitrile-styrene-acrylate graft copolymer (Lotte Advanced Materials Co., Ltd.) obtained by graft-polymerizing a mixture of styrene and acrylonitrile to 50 parts by weight of an acrylic rubbery polymer prepared by using butyl acrylate as a main monomer and having an average particle diameter of about 320 nm (C) Aromatic Vinyl-Vinyl Cyanide Copolymer Styrene-acrylonitrile copolymer (Lotte Advanced Materials Co., Ltd.) having a melt flow index of about 2.4 g/10 min, which was measured at 200° C. under a 5 kg load according to ASTM D1238, and having an acrylonitrile-derived component of about 24 wt %

(D) Zinc Oxide

Zinc oxide (KS-1, Hanil Chemical Co., Ltd.) having specific gravity of 5.47 to 5.64 g/cm$^3$, pH 6.95 to 7.37, an (absolute) refractive index of 1.94 to 2.11, an average particle diameter (D50) of about 1.2 μm, a BET specific surface area of about 4 m$^2$/g, purity of about 99%, a PL size ratio (B/A) of about 0.28, and a crystallite size of about 1,417 Å

(E) Phosphorus-Based Compound Represented by Chemical Formula 1

Stearyl phosphate (ADEKA Corp.) having a melting point of 68 to 75° C. as a phosphorus-based compound satisfying Chemical Formula 1

Evaluation of Physical Properties

Specimens for evaluating properties according to Examples 1 to 4 and Comparative Examples 1 to 6 were measured with respect to antibacterial properties, impact resistance, light resistance, and heat resistance, and the results are shown in Table 2.

(1) Antibacterial properties: According to a JIS Z 2801 antibacterial evaluation method, antibacterial activity was measured by inoculating *Staphylococcus aureus* and *Escherichia coli* to the specimens and culturing them at 35° C. under RH of 90% for 24 hours.

(2) Impact resistance (unit: kgf·cm/cm): According to ASTM D256, ⅛"-thick specimens were measured with respect to notched Izod Impact strength.

(3) Light resistance: In a xenon arc test method specified in SAE J 1885, the specimens were measured with respect to a color change (ΔE) at 89° C. under RH of 50% at 84 MJ/m$^2$ at a lamp wavelength of 300 to 400 nm.

(4) Heat resistance (unit: ° C.): According to ASTM D648, a heat deflection temperature (HDT) was measured under a 18.56 kg load.

TABLE 2

| Properties | | Examples 1 | 2 | 3 | 4 | Comparative Examples 1 | 2 | 3 | 4 | 5 | 6 |
|---|---|---|---|---|---|---|---|---|---|---|---|
| Antibacterial activity value | *Staphylococcus aureus* | 4.6 | 4.6 | 4.6 | 4.6 | 0 | 0 | 4.6 | 4.6 | 4.6 | 4.6 |
| | *Escherichia coli* | 6.2 | 6.2 | 6.2 | 4.2 | 0.4 | 0.4 | 3.2 | 6.2 | 6.2 | 6.2 |
| Izod Impact strength | | 43 | 42 | 45 | 43 | 42 | 20 | 20 | 22 | 37 | 35 |
| Color change | | 0.22 | 0.25 | 0.21 | 0.23 | 0.21 | 0.4 | 0.45 | 0.41 | 0.5 | 0.45 |
| heat deflection temperature | | 116 | 118 | 117 | 117 | 117 | 117 | 115 | 116 | 115 | 115 |

Referring to Tables 1 to 2, the thermoplastic resin compositions of the examples exhibited excellent antibacterial properties, impact resistance, light resistance, and heat resistance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A thermoplastic resin composition, comprising 100 parts by weight of a base resin comprising:

(A) 75 to 85 wt % of a polycarbonate resin, wherein the (A) polycarbonate resin has a melt flow index of 5 to 40 g/10 min, which is measured under the condition of 250° C. and a 10 kg load according to the ASTM D1238 standard;

(B) 7 to 15 wt % of an acrylic rubber-modified aromatic vinyl graft copolymer; and (C) 7 to 13 wt % of an aromatic vinyl-vinyl cyanide copolymer;

(D) 0.7 to 5 parts by weight of zinc oxide (ZnO); and (E) 0.2 to 0.6 parts by weight of a phosphorus-based compound represented by Chemical Formula 1:

$$(RO)_nP(=O)(OH)_{3-n} \quad \text{[Chemical Formula 1]}$$

wherein, in Chemical Formula 1, n is an integer of 1 to 3, and

R is selected from a substituted or unsubstituted C1 to C30 alkyl group, a C2 to C30 alkenyl group, a C2 to C30 alkynyl group, a substituted or unsubstituted C1 to C30 cycloalkyl group, a substituted or unsubstituted C6 to C30 aryl group, and a substituted or unsubstituted C3 to C30 heteroaryl group, wherein the (D) zinc oxide has:

an average particle diameter (D50) of 0.5 to 3 μm;

a peak position 2θ value obtained by X-ray diffraction (XRD) analysis of 35° to 37° and a crystallite size value according to Equation 1 of 1,000 to 2,000 Å:

$$\text{Crystallite size}(D) = \frac{k\lambda}{\beta\cos\theta} \quad \text{[Equation 1]}$$

wherein, in Equation 1, k is a shape factor, λ is an X-ray wavelength, β is a FWHM value (degree) of an X-ray diffraction peak, and θ is a peak position value (degree); and a size ratio (B/A) of a peak A in a 370 to 390 nm region to a peak B in a 450 to 600 nm region of 0.01 to 1 when measuring photoluminescence.

2. The thermoplastic resin composition of claim 1, wherein the (D) zinc oxide has a BET specific surface area of 1 to 10 $m^2/g$.

3. The thermoplastic resin composition of claim 1, wherein the (B) acrylic rubber-modified aromatic vinyl graft copolymer comprises an acrylic rubbery polymer having an average particle diameter of 100 to 500 nm.

4. The thermoplastic resin composition of claim 1, wherein the (B) acrylic rubber-modified aromatic vinyl graft copolymer is obtained by graft polymerization of a monomer mixture including an aromatic vinyl compound and a vinyl cyanide compound to 40 to 60 wt % of an acrylic rubbery polymer.

5. The thermoplastic resin composition of claim 1, wherein the (B) acrylic rubber-modified aromatic vinyl graft copolymer is an acrylonitrile-styrene-acrylate graft copolymer.

6. The thermoplastic resin composition of claim 1, wherein the (C) aromatic vinyl-vinyl cyanide copolymer is a copolymer of a monomer mixture including 60 to 85 wt % of an aromatic vinyl compound and 15 to 40 wt % of a vinyl cyanide-compound.

7. The thermoplastic resin composition of claim 1, wherein the (C) aromatic vinyl-vinyl cyanide copolymer has a melt flow index of 1 to 10 g/10 min measured under the condition of 200° C. and a 5 kg load according to ASTM D1238 standard.

8. The thermoplastic resin composition of claim 1, wherein the (C) aromatic vinyl-vinyl cyanide copolymer is a styrene-acrylonitrile copolymer.

9. The thermoplastic resin composition of claim 1, wherein the thermoplastic resin composition further comprises at least one additive selected from a flame retardant, a nucleating agent, a coupling agent, a filler, a plasticizer, an impact modifier, a lubricant, a release agent, a heat stabilizer, an antioxidant, an inorganic material additive, an ultraviolet (UV) stabilizer, an antistatic agent, a pigment, and a dye.

10. A molded product manufactured from the thermoplastic resin composition of claim 1.

11. The molded product of claim 10, wherein the molded product has a notched Izod impact strength of a ⅛"-thick specimen ranging from 30 to 100 kgf·cm/cm according to ASTM D256.

12. The molded product of claim 10, wherein the molded product has each antibacterial activity value of 2 to 7 which is obtained by inoculating samples with *Staphylococcus aureus* and *Escherichia coli*, and measuring after 24 hours of incubation under the condition of 35° C. and RH of 90% according to the JIS Z 2801 antibacterial evaluation method.

13. The molded product of claim 10, wherein the molded product has a color change (ΔE) of the specimen of greater than 0 and less than 0.4, which is measured at 89° C., RH of 50%, 84 $MJ/m^2$, and a lamp wavelength of 300 to 400 nm by a xenon arc test method specified in SAE J 1885.

14. The molded product of claim 10, wherein the molded product has a heat deflection temperature (HDT) of the specimen of 110 to 200° C., which is measured under a 18.56 kg load according to ASTM D648.

* * * * *